United States Patent [19]

Adams et al.

[11] Patent Number: 4,717,302
[45] Date of Patent: Jan. 5, 1988

[54] COMPOSITE FASTENER

[75] Inventors: Thomas R. Adams, Huntington Beach; Gary R. Wittman, Costa Mesa, both of Calif.

[73] Assignee: Tiodize Company, Inc., Huntington Beach, Calif.

[21] Appl. No.: 621,590

[22] Filed: Jun. 18, 1984

[51] Int. Cl.⁴ .............................................. F16B 35/00
[52] U.S. Cl. .................................. 411/378; 411/427; 411/903
[58] Field of Search ............... 411/368, 378, 427, 500, 411/501, 901, 902, 903, 904, 905, 906, 907; 428/397, 542.8

[56] References Cited

U.S. PATENT DOCUMENTS

| | | |
|---|---|---|
| 2,510,693 | 6/1950 | Green . |
| 2,685,813 | 8/1954 | Lampman et al. . |
| 2,928,764 | 3/1960 | Magoon . |
| 2,943,967 | 7/1960 | Simon . |
| 2,949,054 | 8/1960 | White ................................... 411/418 |
| 3,251,724 | 5/1966 | Spokes et al. . |
| 3,283,050 | 11/1966 | Boggs . |
| 3,452,149 | 6/1969 | Rinaldi ............................ 411/501 X |
| 3,462,289 | 8/1969 | Rohl et al. . |
| 3,495,494 | 2/1970 | Scott . |
| 3,794,509 | 2/1974 | Trauger et al. . |
| 3,826,155 | 7/1974 | Muller . |
| 3,835,615 | 9/1974 | King ................................. 411/368 X |
| 3,859,160 | 1/1975 | Marin . |
| 3,974,012 | 8/1976 | Hogarth . |
| 3,995,092 | 11/1976 | Fuchs . |
| 4,063,838 | 12/1977 | Michael . |
| 4,100,322 | 7/1978 | Seibold et al. . |
| 4,168,337 | 9/1979 | Maistre ............................ 428/397 X |
| 4,178,413 | 12/1979 | DeMunda . |
| 4,237,175 | 12/1980 | Kobayashi . |
| 4,256,790 | 3/1981 | Lackman et al. . |
| 4,263,367 | 4/1981 | Prewo . |
| 4,268,560 | 5/1981 | Maistre ............................ 428/397 X |
| 4,341,840 | 7/1982 | Prewo . |
| 4,367,260 | 1/1983 | Krause . |
| 4,472,097 | 9/1984 | Kiefer et al. .................... 411/907 X |
| 4,472,098 | 9/1984 | Kiefer ............................. 411/907 X |
| 4,478,544 | 10/1984 | Strand ............................. 411/901 X |

FOREIGN PATENT DOCUMENTS

| | | |
|---|---|---|
| 1084088 | 6/1960 | Fed. Rep. of Germany ...... 411/424 |
| 2212762 | 9/1973 | Fed. Rep. of Germany ...... 411/417 |
| 812993 | 3/1981 | U.S.S.R. ............................. 411/501 |

Primary Examiner—Kenneth J. Dorner
Assistant Examiner—Rodney M. Lindsey
Attorney, Agent, or Firm—Morland C. Fischer

[57] ABSTRACT

A fastener member and method of formation are provided wherein a bolt and nut are formed from a block of resin-impregnated fibers woven in a first, second and third plane each perpendicular to the other wherein the fibers in the first plane extend continuously and longitudinally through the fastener member and the fibers in the second and third plane extend to form the peaks and valleys of the helical thread.

9 Claims, 7 Drawing Figures

U.S. Patent     Jan. 5, 1988     4,717,302
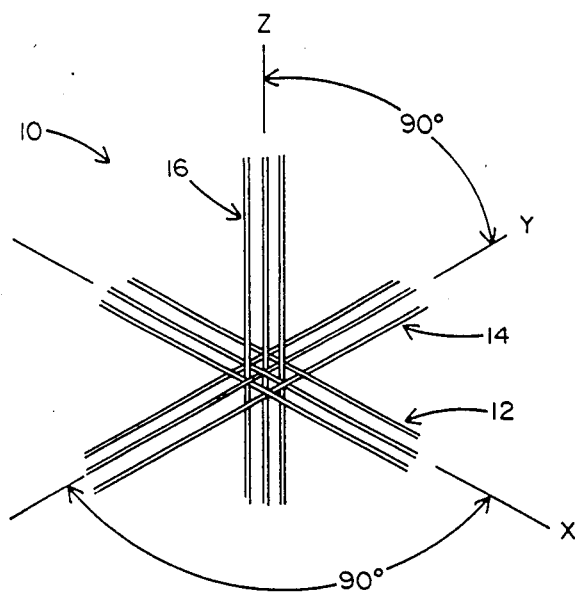
FIG. 1
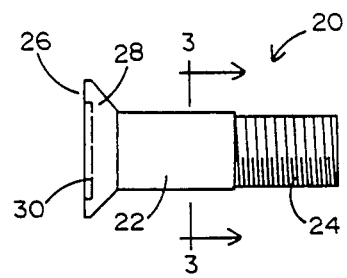
FIG. 2
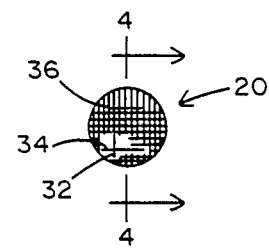
FIG. 3
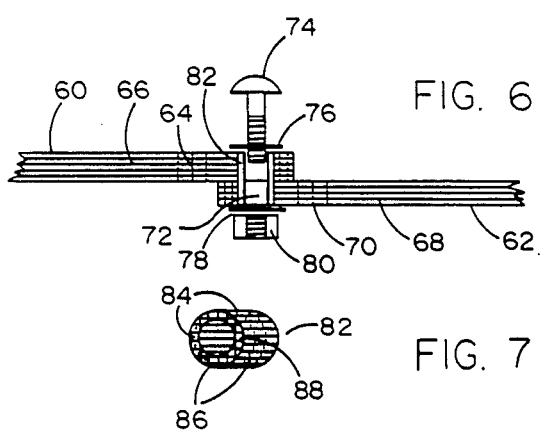
FIG. 6
FIG. 7
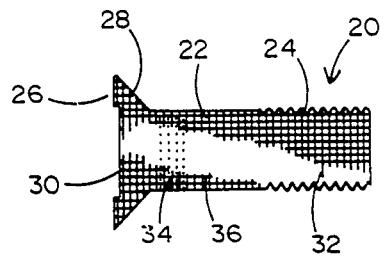
FIG. 4
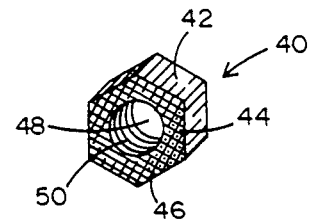
FIG. 5

COMPOSITE FASTENER

FIELD OF THE INVENTION

This invention relates primarily to fastener members and, more particularly, to reinforced fiber composite fasteners and to a production method therefor.

BACKGROUND AND SUMMARY OF THE INVENTION

In recent years, it has become a desideratum to provide a high strength non-metallic fastener. Such a fastener would provide significant advantages in that plastic components which are secured with metallic fasteners may tend to deteriorate due to galvanic corrosion and variations in coefficients of thermal expansion. Moreover, the use of metallic fasteners in aircraft and other such applications may produce a deviation in navigational equipment and problems with electronic equipment.

However, non-metallic fasteners presently known have generally lacked the strength exhibited by metallic fasteners of comparative size and this low strength is very apparent both in thread or threadlike areas. When axial compressive forces are exerted on matingly threaded member, e.g., a nut and a bolt, the threads of the members are subjected to shearing forces which may distort or otherwise damage the thread. Similarly, when such forces are applied to the enlarged head portion of a bolt, the compressive force required to sufficiently secure the workpieces may weaken the fastener at the load bearing plange which extends laterally beyond the fastener shaft.

To withstand such shearing forces, threaded plastic members have included resin impregnated fibers. For example, glass fibers have been helically wound about the longitudinal axis of the fastener, i.e., longitudinally of the threads. In this instance, the forces on the threads have been opposed primarily by the resin bonding between the fibers. As the shear strength of the resin in generally less than that of the resin-impregnated fiber the strength of the members has been less than adequate, due primarily to the two-dimensional fiber orientation which is inevitably subjected to delamination.

Other methods which have been employed to increase the strength of threads include the use of mat reinforcement around pulltruded unidirectional fiber rod. The mat reinforcement has random fiber orientation with multi-directional properties, but as the fibers are not continuous the tendency toward delamination and relatively low strength persists.

U.S. Pat. No. 2,510,693 describes fastening members having a longitudinal fibrous reinforcing medium extending along the stem portion and into the head of the fastener. U.S. Pat. No. 2,685,813 describes a glass-fiber rivet body, including a spirally wound longitudinal fibers and, in an alternative embodiment, the longitudinal fibers are surrounded by braided threads in an essentially helical form.

U.S. Pat. No. 2,928,764 and No. 3,283,050 disclose methods and apparatus for the production of threaded fiber fasteners employing circumferential or helical fiber to form threads. U.S. Pat. Nos. 2,943,967 and 4,063,838 also detail the formation of threaded members with a combination of longitudinal and helical fibers or filaments.

U.S. Pat. No. 3,995,092 details the use of a plurality of laminated sections which are glued together to form the fastener, with the laminations substantially perpendicular to the surface of the threaded shaft. U.S. Pat. No. 3,495,494 again details the use of longitudinal but spirally wound fibers which are oriented along a generally serpentine path to conform substantially to the course of the threads.

According to the present invention, fastener members are formed from multi-dimensional woven fiber preforms having uniform isotropic properties, e.g., three-dimensional orthogonal blocks, molded with organic resins. The fasteners and the threads thereon thus contain a plurality of fibers disposed continuously through the fastener. Specifically, the fibers are disposed in a plane which is essentially perpendicular to the longitudinal axis of the fastener, i.e., as chords of the cross section of the fastener, with the end portions of such chordal fibers extending into the threads and other angular load-bearing flanges of the fastener. For example, the fibers are disposed at right angles in the lateral cross-sectional plane of the fastener so that the end portions of the fibers form the peaks and valleys of the threads. Such fasteners have increased resistance to compressive and shearing forces, and resist delamination as a result of the continuous three-dimensional fiber placement. Moreover, the use of preformed, impregnated blocks allows the economical and advantageous production of fastener members without the need for complex winding or casting machinery or techniques.

BRIEF DESCRIPTION OF THE DRAWINGS

FIG. 1 is a perspective, schematic view of the three-dimensional orthogonal weave of the fiber preform employed in the present invention;

FIG. 2 is a side view of a fastener member according to the present invention;

FIG. 3 is a cross-sectional view taken along the line 3—3 of FIG. 2;

FIG. 4 is a cross-sectional view taken along the line 4—4 of FIG. 3;

FIG. 5 is a perspective view of a fastener member adapted to matingly engage the fastener shown in FIG. 2;

FIG. 6 shows a side view, partially in cross-section, of a three-dimensional composite fastener employed with a bushing; and FIG. 7 shows a perspective view of the bushing of FIG. 6.

DETAILED DESCRIPTION

A detailed illustrative embodiment of the invention is disclosed herein. However, it is to be understood that this embodiment merely exemplifies the invention, which may take forms that are different from the illustration disclosed. Therefore, specific details are not to be interpretated as necessarily limiting, but rather as forming a basis for the claims which define the scope of the invention.

Three-dimensional composite fastener members are formed by the use of multi-dimensional weave fiber preforms which are impregnated with organic thermosetting or thermoplastic resins. The fiber employed can be selected according to the properties desired and the manner in which the fastener is to be used, for example, fiberglass, Kevlar (TM) graphite or carbon fibers may be employed. It is preferred that the filaments be spun into a yarn-like fiber ranging from 12 K (coarse) to as fine as 1 K, with an intermediate yarn of about 6 K believed to provide superior properties for most general applications. The resin system may also be varied according to the desired strength, temperature and environmental requirements. Polyester, epoxy, phenolic, polyimide and bismaleimide resins have proven appropriate. Thermoplastic resins such as polyphenylene sulfide (PPS) or PEEK may be used if post-forming is desirable. In the preferred embodiment described herein, Thermid MC-600, a polyimide resin sold by the National Starch and Chemical Corporation, is employed due to its superior strength, low moisture absorption and excellent characteristics particularly in high temperature applications.

The woven preforms hereinafter described are obtainable from Fiber Materials, Inc., Bedford, Massachusetts and Techniweave, Inc., East Rochester, N.H. In the preferred embodiment herein described, the preforms have a center-to-center spacing of 6 K fiber of about 0.050 inches, equal fiber volume in all axes (x,y and z) and 40 to 50% fiber volume in the preform. Generally, the fiber volume is the preeminent characteristic in the preform specification, with the fiber spacing being determined by the fiber volume and yarn type. At a fiber volume of about 35 percent or less the properties of the fastener, and particularly the strength, begin to subside due to the fact that the fiber is the load-carrying component of such a composite. As the fiber volume of greater than 50 percent, the preform becomes difficult to thoroughly impregnate with resin resulting in a "resin-dry" composite, i.e., a composite containing resin-free voids or bubbles dispersed therethrough. Accordingly, a fiber volume of 40 to 50 percent provides superior strength with most resins.

The woven preform is impregnated with the appropriate resin, and preferably pressure and temperature cured as required. Impregnation may be performed by a variety of methods dependent upon the viscosity of the resin employed, but most generally it is preferred to submerge the preform in a resin solution, i.e., a resin which has been thinned with an appropriate solvent to assist in the dispersion of the resin. If possible, it is desirable to heat the resin-solvent mixture, or the preform, to a temperature which is sufficient to assist in the resin-solvent dispersion. For example, with a thermosetting resin such as the polyimide resin hereinafter specifically described, the preform may be submerged in a resin solution heated to a temperature of about 350° F., such a temperature being below the boiling point of the solvent and also below the curing temperature of the resin.

After impregnation, any solvent which has been added to the resin should be removed to avoid the evolution of the solvent if higher temperatures are applied during the curing process. Thus, the impregnated preform is heated at a temperature which is below both the boiling point of the solvent and the curing temperature of the resin for a period of time which is sufficient to permit solvent vapors to escape. In order to minimize the formation of voids or bubbles within the composite, it is preferable to compress the impregnated preform as the resin begins to cure. Compression molding is known in the art and is generally accomplished by the use of a hydraulic press, wherein the preform is compressed between metal platens coated with a mold release compound.

With any given resin, pressure is applied to the composite only as the resin begins to cure, to avoid deforming the composite. This gelling point may be ascertained by a number of methods. For example, the gelling time of the resin may be predetermined, or uncured resin which is cured under conditions similar to that in the molding press may be observed to detect the onset of the curing process. However, these methods are inherently estimates and thus subject to a certain amount of error.

Accordingly, it is preferred that the gel time be determined by feedback through the press, either by the sensing of the travel of the platens with relation to an increase in pressure by the press operator, or through the use of a microprocessor-controlled, closed-loop system with an automated feedback circuit, such as are sold by Pasadena Hydraulics, Inc. of Pasadena, Calif. Such a system measures resistance by slight platen movements, and as soon as the resistance increases, indicating that the cure is starting, the pressure is increased to that required for compression molding.

For example, with the polyimide resin hereinafter employed in the specific embodiment, a thermosetting resin, the impregnated preform is heated in the molding press to a temperature of 490° F., the curing temperature of the resin. During this initial heating process, a "contact" pressure (10 to 50 psi) is employed. This pressure is applied during the preheating process and is then released or "bumped" momentarily to allow any remaining solvent to escape, and then the "contact" pressure is reapplied. At this point, a light pressure slightly in excess of 50 psi is employed until it is sensed, either by the operator or by the feedback circuit, that the resin is beginning to cure. The pressure is then increased to 500 to 1,000 psi, with a preferred pressure being from about 600 to 700 psi.

This pressure is maintained until the cure of the resin is completed. After cure, additional pressure is not required, although it is preferred to maintain the high temperature employed in the compression molding process to provide increased fastener strength where use in high temperature environments is anticipated. Such post-cure techniques are known in the art for particular resins, and advantageous techniques for the post-cure of Thermid MC-600 are hereinafter set forth wherein the temperature is incrementally increased from the curing temperature in incremental steps, and held at 700° F. for about four hours.

With regard to the specific fastener hereinafter described and tested, a woven preform comprising carbon fiber (Union Carbide T-300 6 K) having center-to-center fiber spacing of 0.050 inches and 50% total fiber volume was employed. A polyimide resin (Thermid MC-600) was prepared by mixing 2 parts of NMP (N-methyl pyrrolidone; 1-methyl-2-pyrrolidinone) with one part of MC-600 by weight, and heating to 350° F. The woven preform was submerged in the resin-solvent mixture and thus impregnated. After impregnation the NMP was driven off by heat (360 F.) in an air-circulating oven until volatile content of the impregnated preform was about 2 to 3% by weight. Generally, the time in the oven is approximately 1 hour. However, if the air circulating oven does not adequately release the solvent, a vacuum oven may be employed at a temperature of 300° to 325° F. and a pressure of 25 to 30 inches of mercury to hasten the solvent release.

After such evaporation of the solvent, the preform was molded between platens at 485° F. In this regard, it should be noted that the gel time of Thermid MC-600 is approximately 90 seconds. The preform was then placed between the platens of a hydraulic press at a temperature of 495° F. and a pressure of about 20 psi was applied for 30 seconds. This pressure was then released for a few seconds, followed by a re-application of the 20 pound pressure for about one minute. Thereafter, a pressure of 650 psi was applied as the resin began to gel. The preform was cured for about 1 hour at 485° F. with the 600–700 psi pressure.

Thereafter, the cured preform is cooled under pressure to below 350° F. before pressure release. The block was then post-cured in an oven with a temperature rise of approximately 1° F. per minute to 600° F., and left at this temperature for about 1 hour. Thereafter, the temperature is again increased at 1° F. per minute to 700° F., which temperature was maintained for 4 hours.

Thereafter, cooling is begun at a rate of approximately 2° F. per minute, and upon cooling to room temperature the block is ready to machine, as described.

The block thus formed may be ground in any precision lathe generally used to grind fasteners. However, when the fibers and resins described herein are employed, a fine grinding wheel is desirable and a carbide or diamond grinding wheel with a grit of 100 to 120 is preferred. A typical grinding speed is about 3000 revolutions per minute with a 1½ inch diameter wheel. Speed of rotation and travel of the lathe should be relatively slow to keep the grinding pressure low. It will be appreciated that the fine particles and dust created during such grinding should be collected with a vacuum system.

FIG. 1 shows the three-dimensional arrangement of the fibers in the woven preform of the preferred embodiment, although it should be understood that other types of multi-dimensional weaves may be employed as required by specific applications. In that figure a woven preform 10 is shown as comprising a plurality of fibers 12 disposed along an x-axis, a second plurality of fibers 14 disposed along a y-axis and a third plurality of fibers 16 along a z-axis. Each of the pluralities, 12, 14 and 16 are seen to be disposed at angles of 90°. The center-to-center spacing of the fibers of about 0.050 inches provides a 40 to 50% fiber volume in the preform 10. The preform 10 is impregnated with a curable resin, as described above, to form a block from which fastener members are machined.

Turning now to FIG. 2, a bolt 20 machined from the impregnated preform 10 will be described. The bolt 20 is seen to include a shank 22 including a threaded portion 24. At an end opposite the threaded portion 24, the bolt 20 is seen to include an enlarged head portion 26, including a bearing face 28 and a slot 30 for the insertion of a driving tool such as a screw driver, which is not specifically shown.

Turning now to FIGS. 3 and 4, cross sectional views of the bolt 20 will be described. In those figures, it should be noted that the bolt 20 includes a plurality of fibers indicated by the reference numeral 32, disposed at right angles to the fibers indicated by the numeral 34. Each of the plurality of fibers 32 and 34 are, in turn, disposed at 90° to the plurality of fibers 36, which are oriented axially with respect to the shank 22.

Turning now to FIG. 5, a nut 40 is shown. The nut 40 is formed from a resin-impregnated composite-fiber block identical to that described with respect to the bolt 20, and is seen to include fibers 42, 44 and 46. The nut 40 is seen to include an aperture 48 including internal threads 50 adapted to matingly engage the threaded portion 24 of the bolt 20.

As shown in FIG. 6, a two-dimensional composite panel 60 is seen to overlie a similar panel 62. Each of the panels 60 and 62 are seen to be formed, respectively, from fibers 64, 66 and 68, 70. The panels 60 and 62 are seen to be bored to form an aperture 72 adapted to receive a bolt 74 therein. The bolt 4 is seen to cooperate with washers 76 and 78, and the nut 80, to secure the panels 60 and 62. Since the panels 60 and 62 lack a vertical fiber orientation which would provide resistance to vertical compressive force, the higher compression bearing stress provided by the use of a three-dimensional composite fastener could well damage the panels 60 and 62. Accordingly, a three-dimensional composite bushing 82 is provided to enable a higher fastener compression bearing stress to be applied without damage to the composite panels 60 and 62 which are being secured. The bushing 82 also isolates the fastener 74 from the aperture 72 to ensure against delamination of the two-dimensional components during insertion of the fastener.

As seen in FIG. 7, the bushing 82 is seen to have been machined from a resin-impregnated woven preform 10 in a manner similar to that described with regard to the fastener 20 according to grinding means which are known in the art, and includes axial fibers 84 and transverse fibers 86 and 88.

The fastener members of the present invention provide significant advantages with regard to shear strength due to the fact that the three-dimensional reinforced fibers extend transversely and continuously along the three dimensions of the fastener member. In a specific example, a fastener having a 3/16 inch shank diameter with a 10-32 UNJF-3A thread was machined, as described above, to an existing metal fastener design as shown in FIG. 2. Test results indicated that the shear strength through the shank was greater than 31,000 pounds per square inch. The same fastener design, when tested in tension with the load being applied through the head and a nut screwed into the threads, failed by shearing the countersunk head from the shank without any damage to the threads. This sheer strength value is comparable to that provided by the metallic fastener of similar design.

It should be understood that while the preferred embodiment described herein is directed to threaded fasteners, fasteners such as pins, washers, collars, studs, rivets and other cylindrical fasteners are within the ambit of the invention, the scope of which is limited by the following claims.

What is claimed is:

1. A fastener member having at least one transverse integral load-bearing flange, comprising a first plurality of resin-impregnated fibers extending continuously therethrough along a longitudinal axis, a second plurality of resin-impregnated fibers disposed transversely at right angles to the first plurality and a third plurality of resin-impregnated fibers disposed transversely at right angles to each of the first and second plurality, wherein at least a portion of the second and third plurality of resin-impregnated fibers extends continuously across the cross-section of the fastener to form the load-bearing flange.

2. The fastener member of claim 1 wherein the flange comprises a helical thread on a surface of the fastener.

3. The fastener member of claim 2 which further includes a shank and an enlarged head portion, and wherein the thread is disposed on an external surface of the shank.

4. The fastener of claim 2 wherein the fastener is hollow and the thread is continuous and disposed on an internal surface thereof.

5. The fastener member of claim 1 wherein the fastener includes a longitudinal shank and the load-bearing flange comprises helical threads on the exterior surface of the shank, and wherein a portion of the second and third plurality of resin-impregnated fibers extend continuously and transversely across the cross-section into the thread.

6. The fastener member of claim 1 or 5 wherein the load-bearing flange further comprises a head portion including a workpiece-abutting surface.

7. A fastener member having a longitudinal shank including an externally-threaded portion at a first end and an enlarged portion at an end opposite the threaded portion, the member comprising a plurality of resin-impregnated fibers disposed in a first, second and third plane each perpendicular to the other, wherein the fibers in the first plane extend continuously and longitudinally from the first to the opposite end and the fibers in the second and third plane extend continuously between transversely-opposed surfaces of the fastener member.

8. A fastener comprising a hollow member having an interior surface and a continuous, integral thread thereon, the fastener comprising a plurality of resin-inpregnated fibers disposed in a first, second and third plane each perpendicular to the other, wherein the fibers in the first plane extend continuously along the axis of the hollow member and the fibers in the second and third planes extend between the threads and an external surface of the fastener.

9. A fastener assembly for securing first and second workpieces by disposal through coaxial apertures formed therethrough, the assembly comprising:
 a bolt member having a longitudinal shank including an externally-threaded portion at a first end and an enlarged head portion at an end opposite the threaded portion, and including a plurality of resin-impregnated fibers disposed in a first, second and third plane each perpendicular to the other wherein the fibers in the first plane extend continuously and longitudinally from the first to the opposite end, and the fibers in the second and third planes extend continuously between transversely-opposed surfaces to the fastener member;
 a nut member including an internally-threaded aperture matingly engagable with the threaded portion, the nut member including resin-impregnated fibers disposed in a first, second and third plane each perpendicular to the other, wherein a portion of the fibers of two of said planes extends to form the peaks and valleys of said internally-threaded aperture; and
 an annular sleeve including resin-impregnated fibers disposed in a first, second and third plane each perpendicular to the other, wherein the fibers in the first plane extend continuously and axially from a first to a second longitudinal end of the sleeve;
 wherein the sleeve extends axially from the external surface of the first workpiece to the external surface of the second workpiece for relieving compressive loads on said first and second workpieces and for receiving said bolt member therethrough.

* * * * *